(12) United States Patent
Mills

(10) Patent No.: US 11,584,221 B2
(45) Date of Patent: Feb. 21, 2023

(54) EVAPORATIVE EMISSIONS FUEL TANK VENTING SYSTEM POSITIONED IN VAPOR LINE

(71) Applicant: Eaton Intelligent Power Limited, Dublin (IE)

(72) Inventor: Vaughn K. Mills, Chelsea, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/118,640

(22) Filed: Dec. 11, 2020

(65) Prior Publication Data
US 2021/0094411 A1 Apr. 1, 2021

Related U.S. Application Data

(63) Continuation of application No. PCT/EP2019/025177, filed on Jun. 11, 2019.
(Continued)

(51) Int. Cl.
*B60K 15/035* (2006.01)
*B60K 15/03* (2006.01)
*F16K 31/524* (2006.01)

(52) U.S. Cl.
CPC .. *B60K 15/03519* (2013.01); *B60K 15/03504* (2013.01); *B60K 2015/03296* (2013.01);
(Continued)

(58) Field of Classification Search
CPC ........ B60K 15/03519; B60K 15/03504; B60K 2015/03296; B60K 2015/03514;
(Continued)

(56) References Cited

U.S. PATENT DOCUMENTS 4,887,578 A * 12/1989 Woodcock ....... B60K 15/03504
123/519
4,941,587 A * 7/1990 Terada ................... B60K 15/04
220/746
(Continued)

FOREIGN PATENT DOCUMENTS

WO 9801316 A1 1/1998

OTHER PUBLICATIONS

International Search Report for International Application No. PCT/EP2019/025177 dated Nov. 13, 2019, 11 pages.

*Primary Examiner* — Craig J Price
(74) *Attorney, Agent, or Firm* — RMCK Law Group PLC

(57) ABSTRACT

A vent shut-off assembly configured to manage venting on a fuel tank includes a main housing, a poppet valve and an actuator. The main housing is positioned outside of the fuel tank and selectively vents to a canister. The poppet valve is disposed in the main housing and includes a plunger that provides over pressure relief (OPR) and over vacuum relief (OVR) functions. The actuator assembly can be housed in the main housing and includes a cam assembly having a cam shaft that includes a cam having a profile that one of opens and closes the poppet valve. When the poppet valve is in the closed position, vapor is precluded from passing between the fuel tank and the canister. When the poppet vale is in the open position, vapor is permitted from passing between the fuel tank and the canister.

16 Claims, 16 Drawing Sheets

Related U.S. Application Data

(60) Provisional application No. 62/683,353, filed on Jun. 11, 2018.

(52) U.S. Cl.
CPC .............. *B60K 2015/03514* (2013.01); *B60K 2015/03585* (2013.01); *F16K 31/52408* (2013.01)

(58) Field of Classification Search
CPC  B60K 2015/03585; B60K 2015/03256; F16K 3/184; F16K 3/186; F16K 7/16; F16K 31/52; F16K 31/523; F16K 31/524; F16K 31/52416; F16K 31/52475; F16K 31/52483; F16K 31/52408; F02M 25/089; F02M 25/0818; F02M 25/0836; F02M 25/0854; F02M 25/0809; F02M 25/0845; Y10T 137/86292–8634; Y10T 137/7771–7778
USPC ...... 137/583–589, 493–493.9; 123/516, 518, 123/519, 520; 141/59, 290, 312, 348, 141/349; 251/248–261
See application file for complete search history.

(56) References Cited

U.S. PATENT DOCUMENTS

| | | | |
|---|---|---|---|
| 5,014,742 A | 5/1991 | Covert et al. | |
| 5,103,877 A * | 4/1992 | Sherwood | B60K 15/04 220/748 |
| 5,226,397 A * | 7/1993 | Zabeck | F02M 25/0836 123/518 |
| 5,404,906 A | 4/1995 | Aoshima et al. | |
| 5,605,177 A * | 2/1997 | Ohashi | B60K 15/03519 141/59 |
| 8,273,074 B2 * | 9/2012 | Jaeb | A61M 1/74 604/317 |
| 10,400,713 B2 * | 9/2019 | Mills | F02M 25/0872 |
| 10,473,062 B2 * | 11/2019 | Ishihara | B60K 15/03519 |
| 10,662,900 B2 * | 5/2020 | Franklin | F02M 25/08 |
| 10,774,792 B2 * | 9/2020 | Mills | B60K 15/035 |
| 10,947,913 B2 * | 3/2021 | Nahar | B60K 15/03504 |
| 10,954,894 B2 * | 3/2021 | Mills | F02D 41/004 |
| 11,091,027 B2 * | 8/2021 | Mills | B60K 15/03504 |
| 2007/0062495 A1 * | 3/2007 | Kano | F02M 25/0836 123/520 |
| 2008/0105329 A1 | 5/2008 | Benjey | |
| 2012/0047807 A1 * | 3/2012 | Lee | E05B 83/34 49/349 |
| 2013/0014730 A1 * | 1/2013 | Shimura | F02M 25/089 123/520 |
| 2017/0030302 A1 * | 2/2017 | Takezawa | F02M 25/089 |
| 2017/0045019 A1 | 2/2017 | Dudar et al. | |
| 2017/0328311 A1 * | 11/2017 | Franklin | F16K 11/0836 |
| 2018/0072153 A9 | 3/2018 | Walter et al. | |
| 2018/0087475 A1 | 3/2018 | Mills et al. | |
| 2018/0195445 A1 * | 7/2018 | Iriyama | F02D 41/003 |
| 2020/0391585 A1 * | 12/2020 | Pifer | F02M 25/0836 |
| 2020/0406746 A1 * | 12/2020 | Glickman | B60K 15/05 |

* cited by examiner

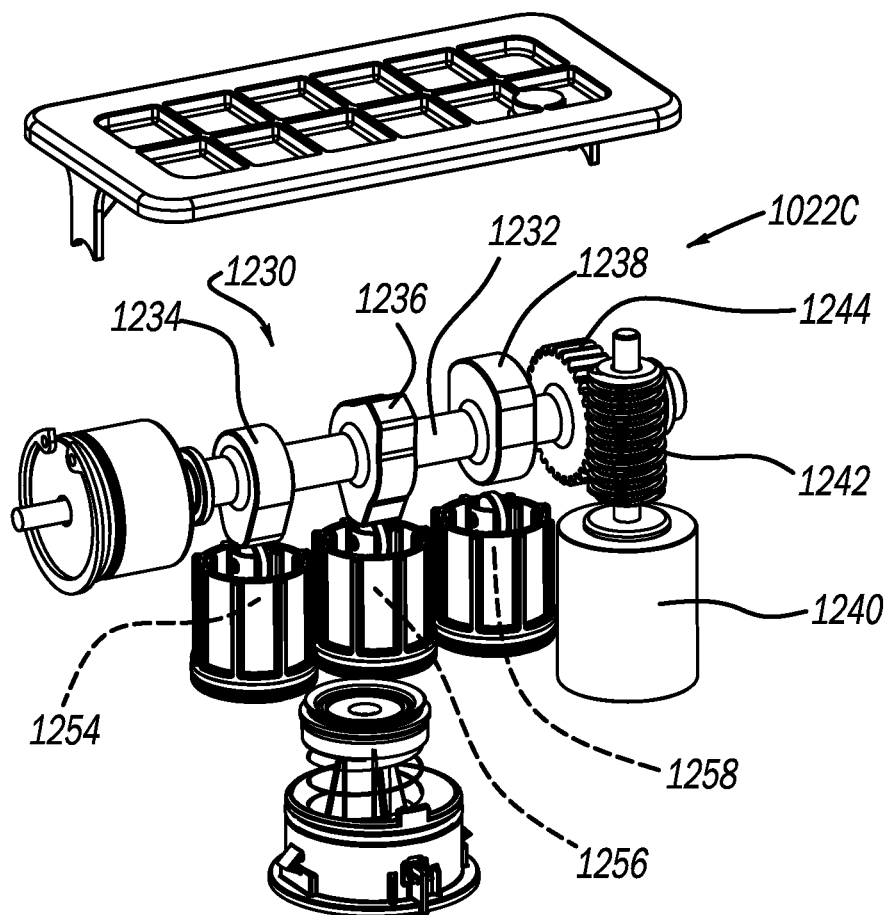
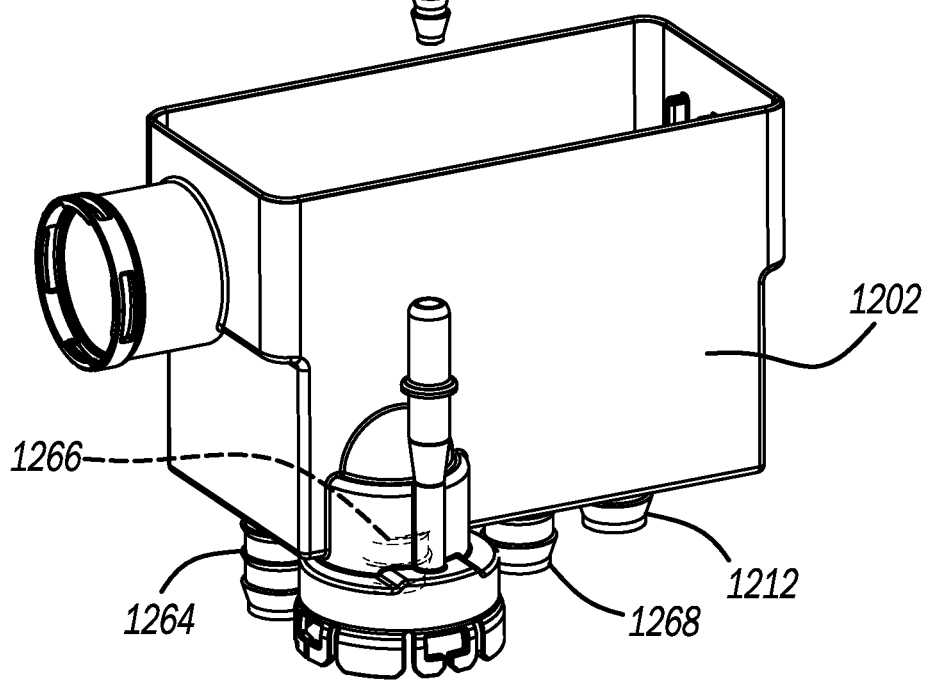
FIG - 13

EVAPORATIVE EMISSIONS FUEL TANK VENTING SYSTEM POSITIONED IN VAPOR LINE

CROSS REFERENCE TO RELATED APPLICATIONS

This application is a continuation of International Application No. PCT/EP2019/025177 filed Jun. 11, 2019, which claims priority to U.S. Provisional Application No. 62/683,353 filed on Jun. 11, 2018. The disclosure of the above application is incorporated herein by reference.

FIELD

The present disclosure relates generally to fuel tanks on passenger vehicles and more particularly to an electronically controlled module that manages the complete evaporative system for the vehicle and that is positioned in the vapor line between the fuel tank and the carbon canister.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle. In fuel tanks configured for use with a hybrid powertrain it is also necessary to properly vent the fuel tank. Such fuel tanks need to account for high pressures and can incorporate an over pressure relief (OPR) and over vacuum relief (OVR). Moreover, it may also be necessary to provide a means for OVR in a conventional gasoline fuel tank system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vent shut-off assembly configured to manage venting on a fuel tank configured to deliver fuel to an internal combustion engine includes a main housing, a poppet valve and an actuator. The main housing is positioned outside of the fuel tank and selectively vents to a carbon canister. The poppet valve is disposed in the main housing and includes a plunger that provides over pressure relief (OPR) and over vacuum relief (OVR) functions. The actuator assembly can be housed in the main housing and includes a cam assembly having a cam shaft that includes a cam having a profile that one of opens and closes the poppet valve. When the poppet valve is in the closed position, vapor is precluded from passing between the fuel tank and the carbon canister. When the poppet vale is in the open position, vapor is permitted from passing between the fuel tank and the carbon canister.

According to additional features, the main housing further defines an inlet port that is fluidly connected to at least one roll over valve disposed within the fuel tank through a tank vent line. The main housing further defines an outlet port that is fluidly connected to the carbon canister through a canister vent line. The actuator assembly further includes a motor. A worm gear can rotatably couple the motor and the cam shaft. The actuator assembly moves based on an input from a controller. The vent shut-off assembly operates during an over pressure relief (OPR) event wherein pressure within the fuel tank is great enough to cause a disk seal to be lifted off of a sealed position with a seat allowing vapor to pass from the fuel tank to the carbon canister. A first spring can bias the disk seal toward the seat. The vent shut-off assembly operates during an over vacuum relief (OVR) event wherein pressure within the fuel tank has dropped low enough to cause a vacuum wherein a collar of poppet is lifted off of a sealing engagement with the disk seal allowing vapor to pass into the fuel tank. A second spring can bias the collar toward the disk seal.

In other features the vent shut-off assembly further includes a recirculation line plunger having a seal that selectively lifts off a valve seat based on urging from the cam. The recirculation line plunger is fluidly coupled to a refueling filler neck that is fluidly coupled to the fuel tank.

A vent shut-off assembly configured to manage venting on a fuel tank configured to deliver fuel to an internal combustion engine includes a main housing, a poppet valve, an actuator and a recirculation line plunger. The main housing is positioned outside of the fuel tank and selectively vents to a carbon canister. The poppet valve is disposed in the main housing and includes a plunger that provides over pressure relief (OPR) and over vacuum relief (OVR) functions. The actuator assembly can be housed in the main housing and includes a cam assembly having a cam shaft that includes a cam having a profile that one of opens and closes the poppet valve. When the poppet valve is in the closed position, vapor is precluded from passing between the fuel tank and the carbon canister. When the poppet vale is in the open position, vapor is permitted from passing between the fuel tank and the carbon canister. The recirculation line plunger has a seal that selectively lifts off a valve seat based on urging from the cam. The recirculation line plunger is fluidly coupled to a refueling filler neck that is fluidly coupled to the fuel tank.

According to additional features, the main housing further defines an inlet port that is fluidly connected to at least one roll over valve disposed within the fuel tank through a tank vent line. The main housing further defines an outlet port that is fluidly connected to the carbon canister through a canister vent line. The vent shut-off assembly operates during an over pressure relief (OPR) event wherein pressure within the fuel tank is great enough to cause a disk seal to be lifted off of a sealed position with a seat allowing vapor to pass from the fuel tank to the carbon canister. A first spring can bias the disk seal toward the seat. The vent shut-off assembly operates during an over vacuum relief (OVR) event wherein pressure within the fuel tank has dropped low enough to cause a vacuum wherein a collar of poppet is lifted off of a sealing engagement with the disk seal allowing vapor to pass into the fuel tank. A second spring can bias the collar toward the disk seal.

BRIEF DESCRIPTION OF THE DRAWINGS

The present disclosure will become more fully understood from the detailed description and the accompanying drawings, wherein:

FIG. 13 is an exploded view of the vent shut-off assembly of FIG. 10;

DETAILED DESCRIPTION

Figure 1:
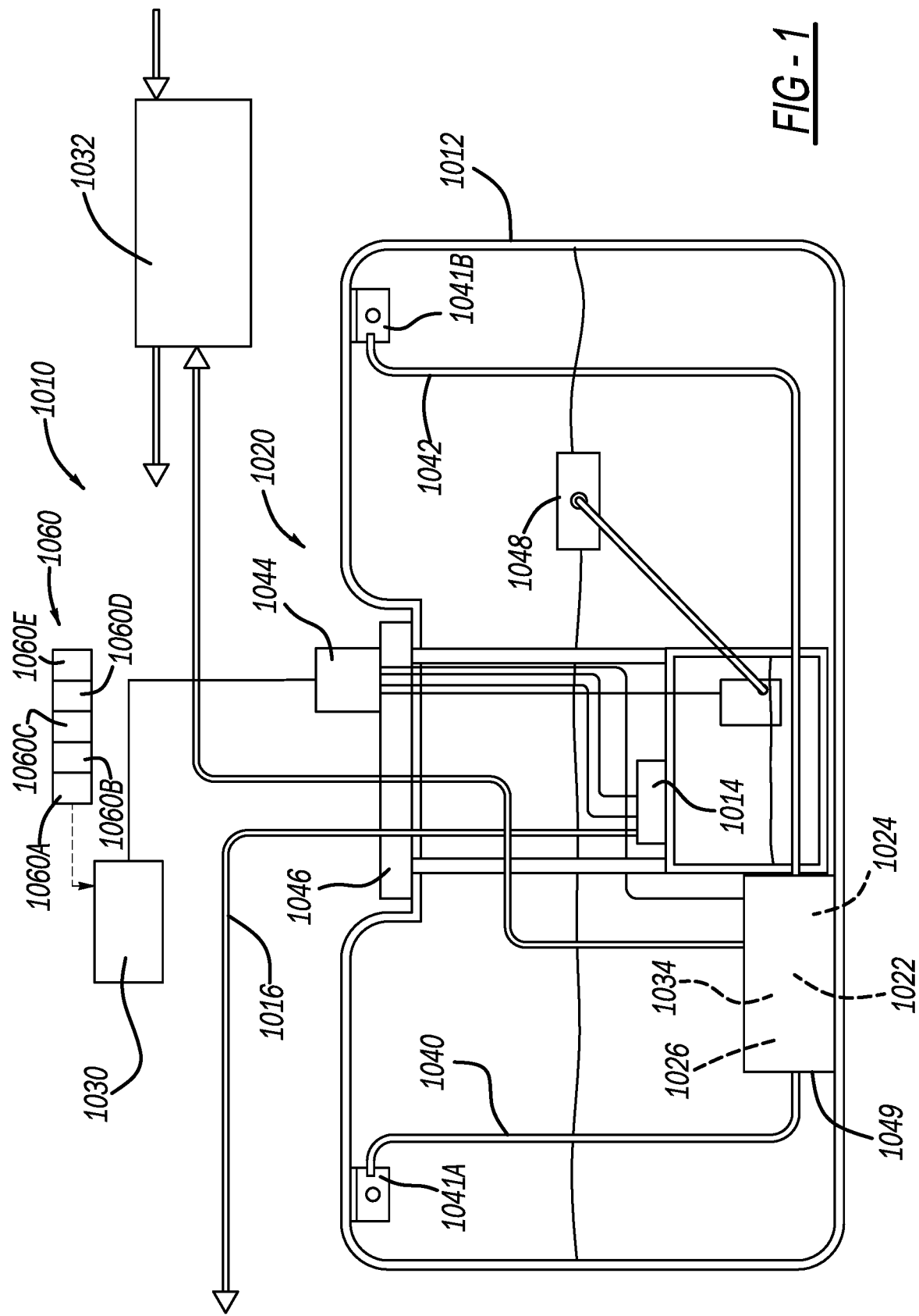
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative emissions control system 1020 provides a universal design for all regions and all fuels. In this regard, the requirement of unique components needed to satisfy regional regulations may be avoided. Instead, software may be adjusted to satisfy wide-ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 3) that routes venting to an appropriate vent tube 1040 and 1042 (or other vent tubes) based on operating conditions. As will become appreciated from the following discussion, the vent shut-off assembly 1022 can take many forms such as electrical systems including solenoids and mechanical systems including DC motor actuated cam systems.

Figure 2:
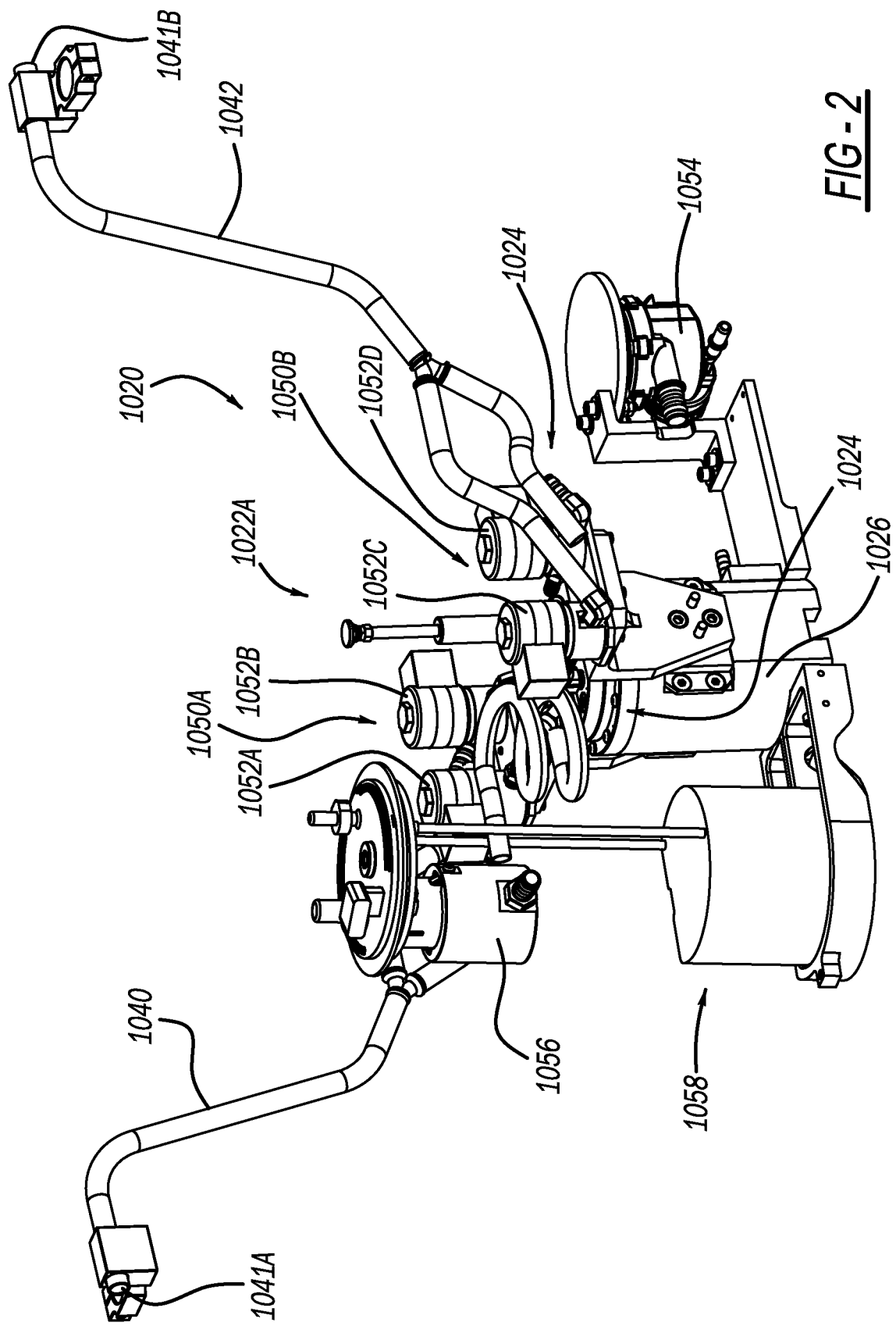
FIG. 2 is a front perspective view of an evaporative emissions control system including a vent shut-off assembly configured with solenoids according to one example of the present disclosure.
Figure 3:
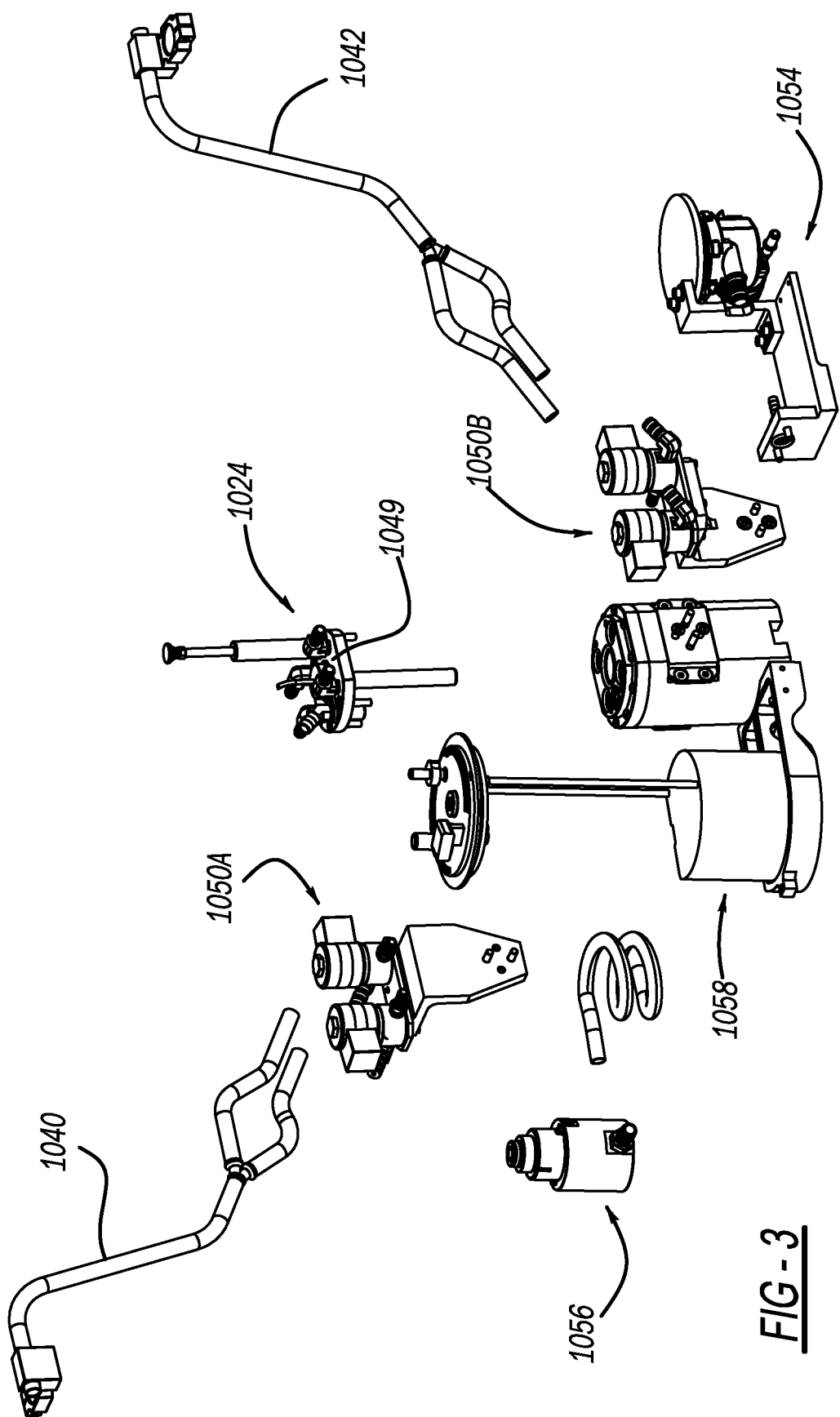
FIG. 3 is an exploded view of the evaporative emissions control system of FIG. 2.

Turning now to FIGS. 2 and 3, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 1. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids 1052A and 1052B can be fluidly connected to the vapor tube 1040. The third and fourth solenoids 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a tank pressure sensor 1060D that senses a pressure in the fuel tank 1012 and a vehicle grade sensor and or vehicle accelerometer 1060E that measures a grade and/or acceleration of the vehicle. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The float level sensor assembly 1048 can provide fill level indications to the control module 1030.

When the evaporative emissions control system 1020 is configured with the vent shut-off assembly 1022A, the control module 1030 can close individual solenoids 1052A-1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 1-3, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. In some examples, the poppet valve assembly or cam lobes will determine smaller orifice sizes. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as grade vent valves (GVV's) and fill limit vent valves (FLVV's), canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 4:
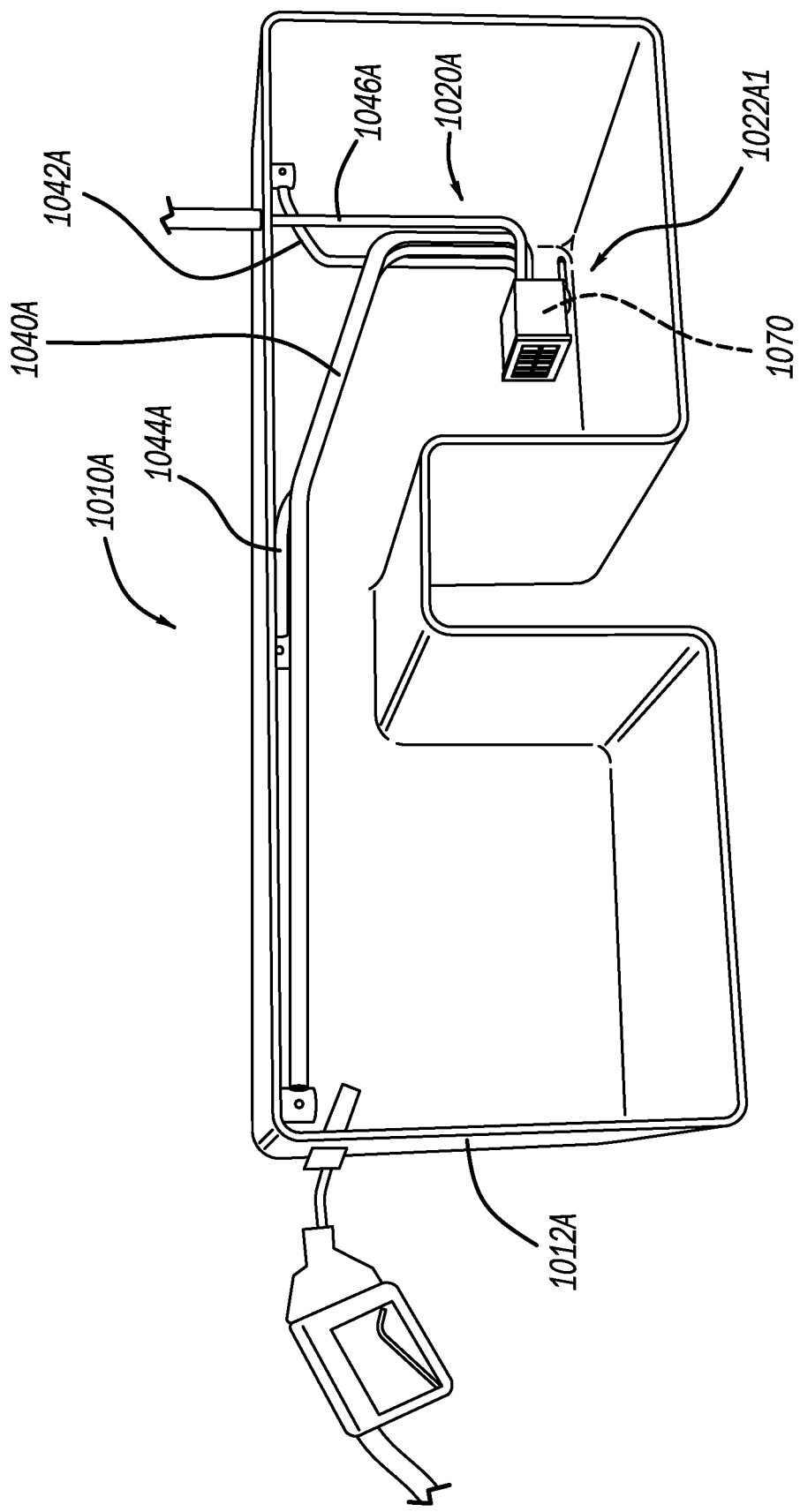
FIG. 4 is a perspective view of a fuel tank system having a vent shut-off assembly and configured for use on a saddle fuel tank according to another example of the present disclosure and shown with the fuel tank in section view.
Figure 5:
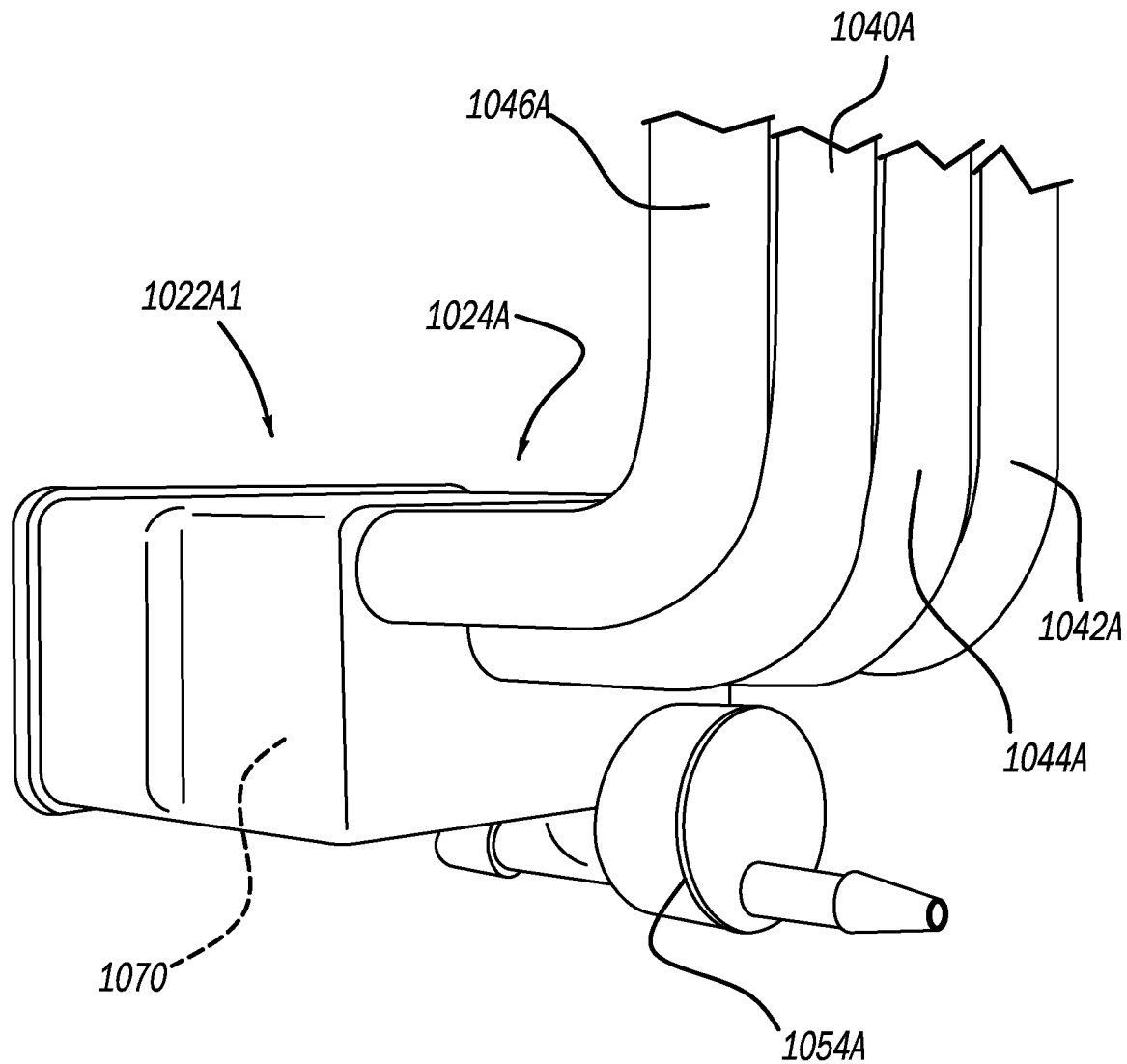
FIG. 5 is a perspective view of the vent shut-off assembly of the fuel tank system of FIG. 4.

Turning now to FIGS. 4 and 5, a fuel tank system 1010A constructed in accordance to another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routs to a first vent 1040A, a second vent line 1042A and a third vent line 1044A. A vent 1046A routs to the canister (see canister 1032, FIG. 1). A liquid trap and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Figure 6:
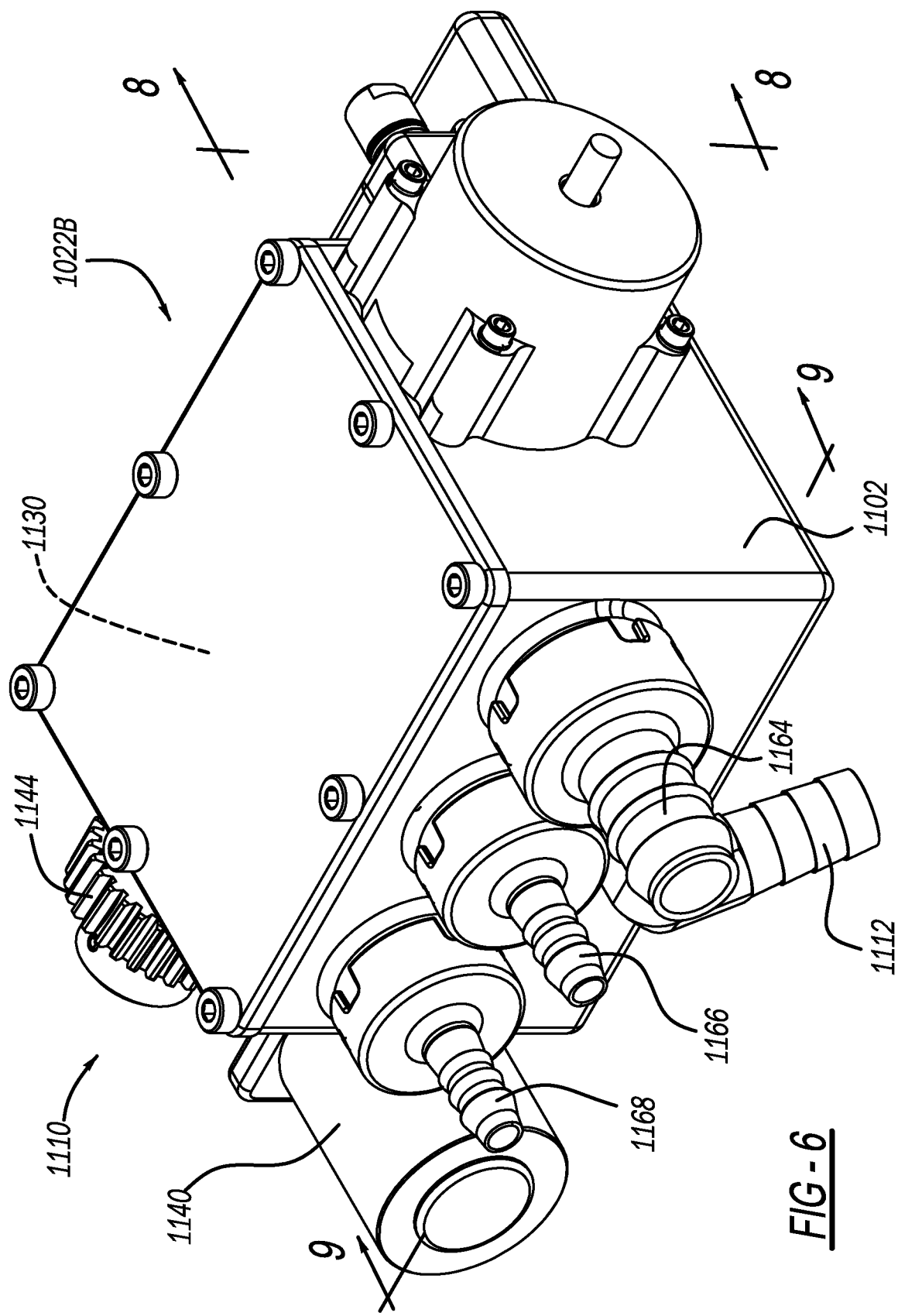
FIG. 6 is a top perspective view of a vent shut-off assembly constructed in accordance to additional features of the present disclosure.
Figure 7:
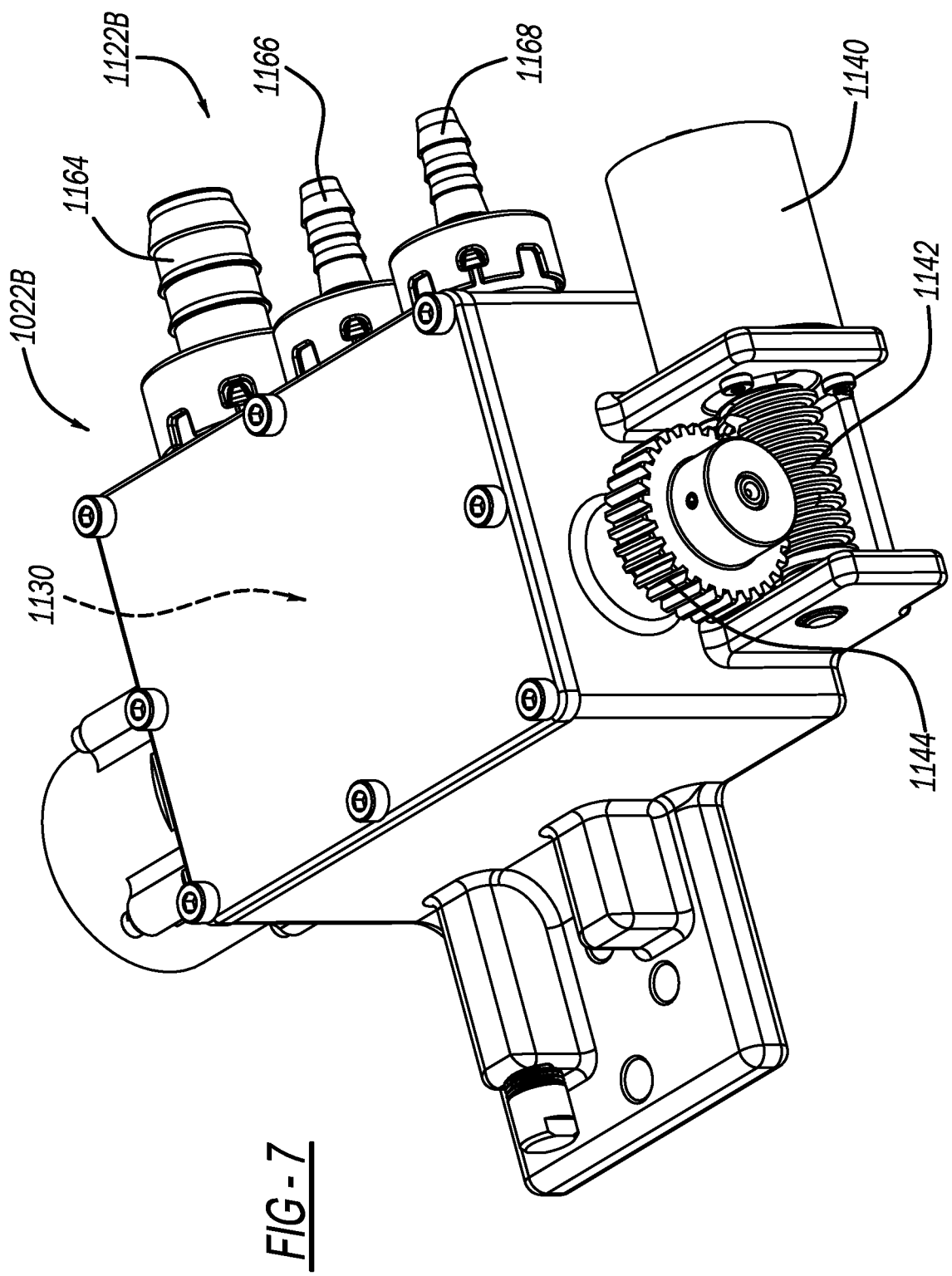
FIG. 7 is a bottom perspective view of the vent shut-off assembly of FIG. 6.
Figure 8:
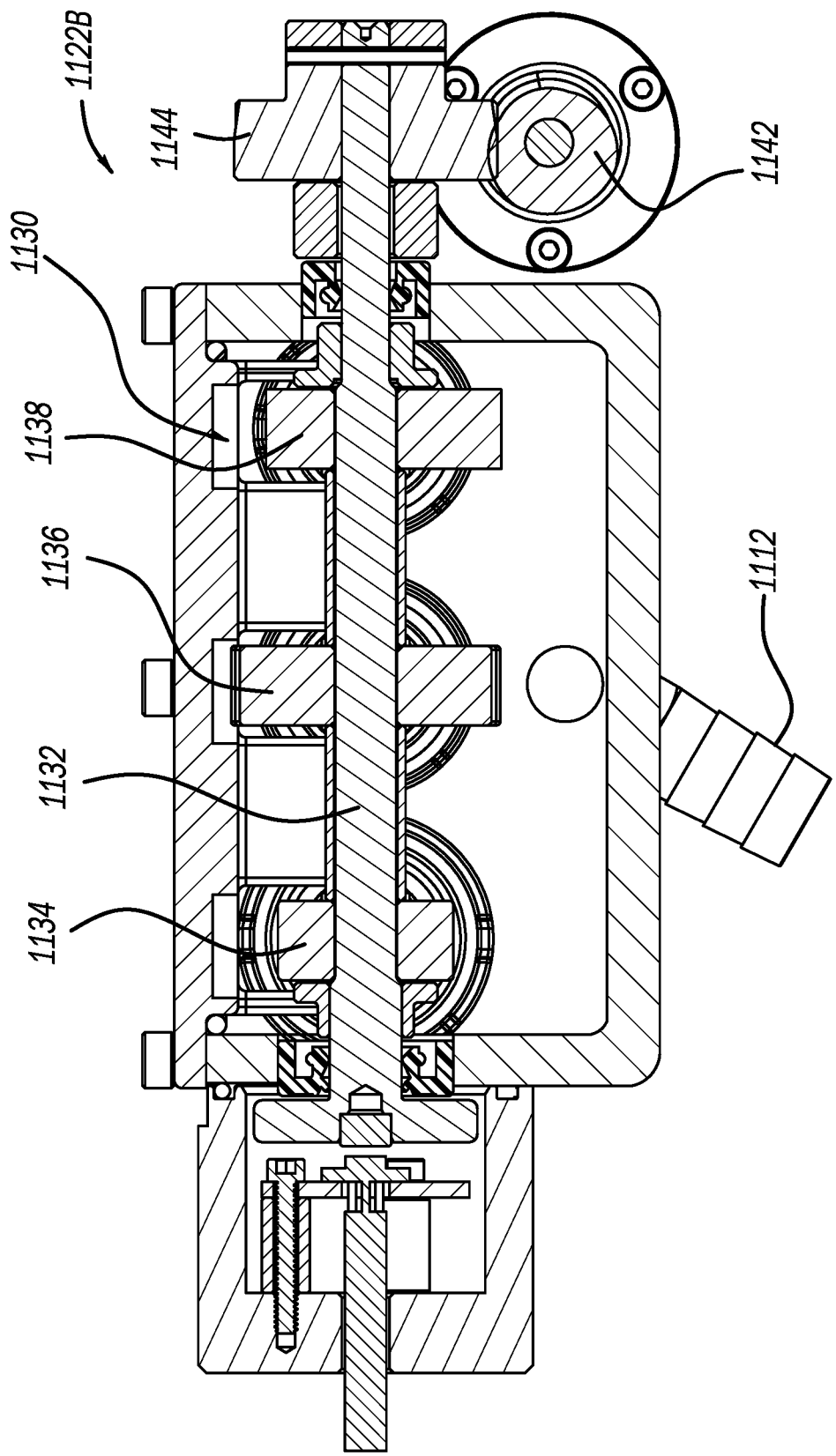
FIG. 8 is a sectional view of the vent shut-off assembly of FIG. 6 taken along lines 8-8.
Figure 9:
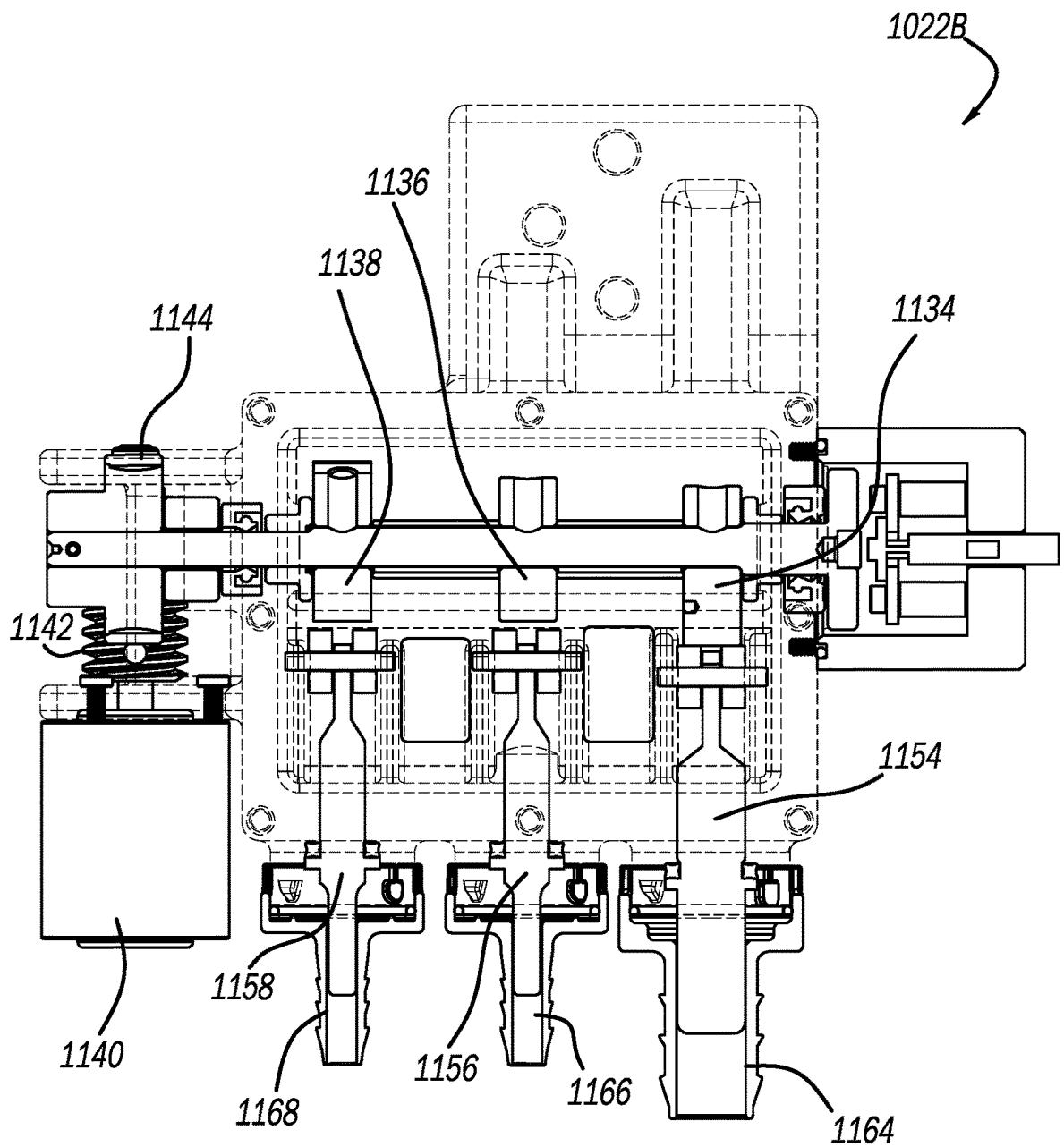
FIG. 9 is a sectional view of the vent shut-off assembly of FIG. 6 taken along lines 9-9.
Figure 10:
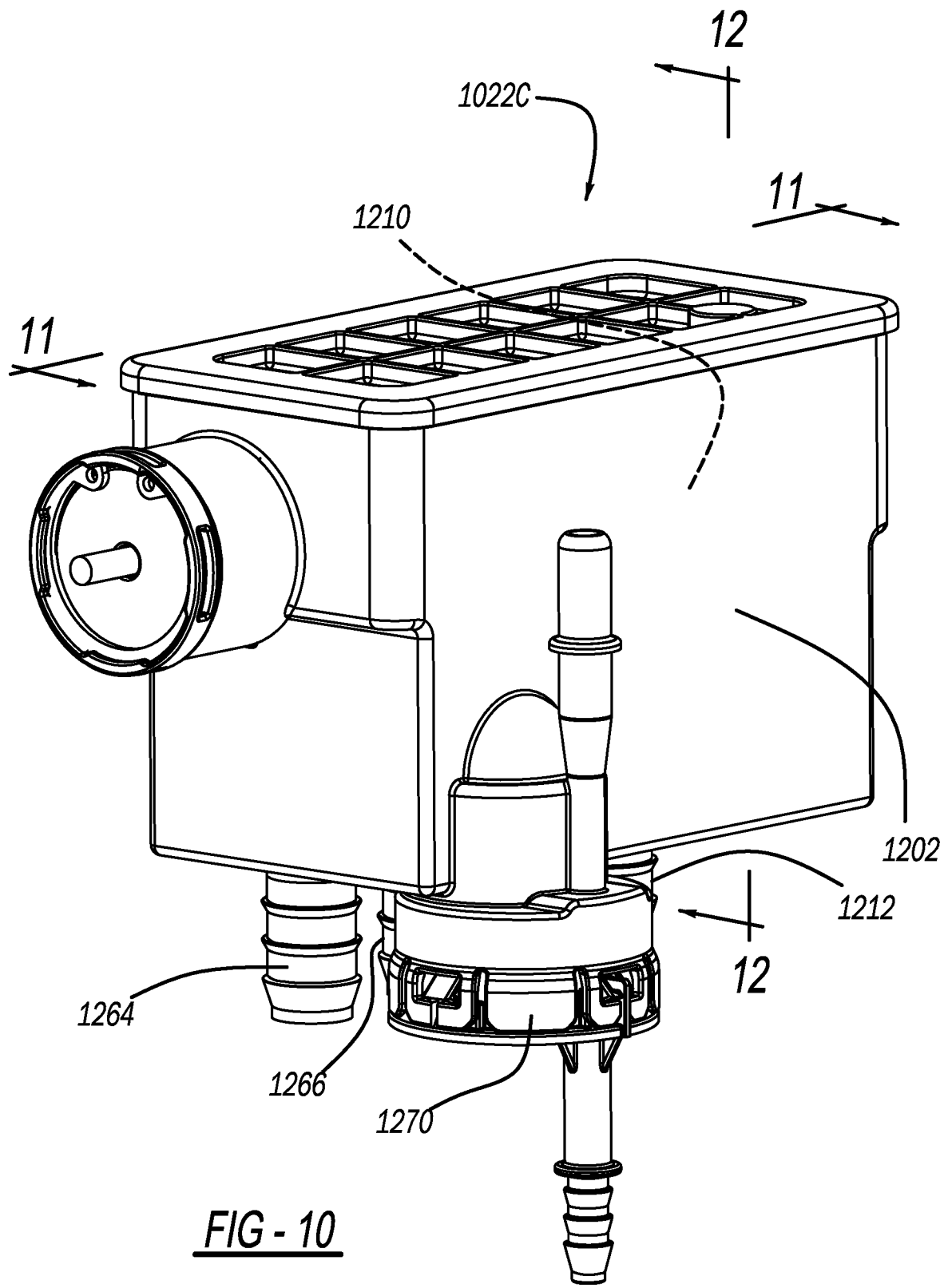
FIG. 10 is a front perspective view of a vent shut-off assembly constructed in accordance to another example of the present disclosure.
Figure 11:
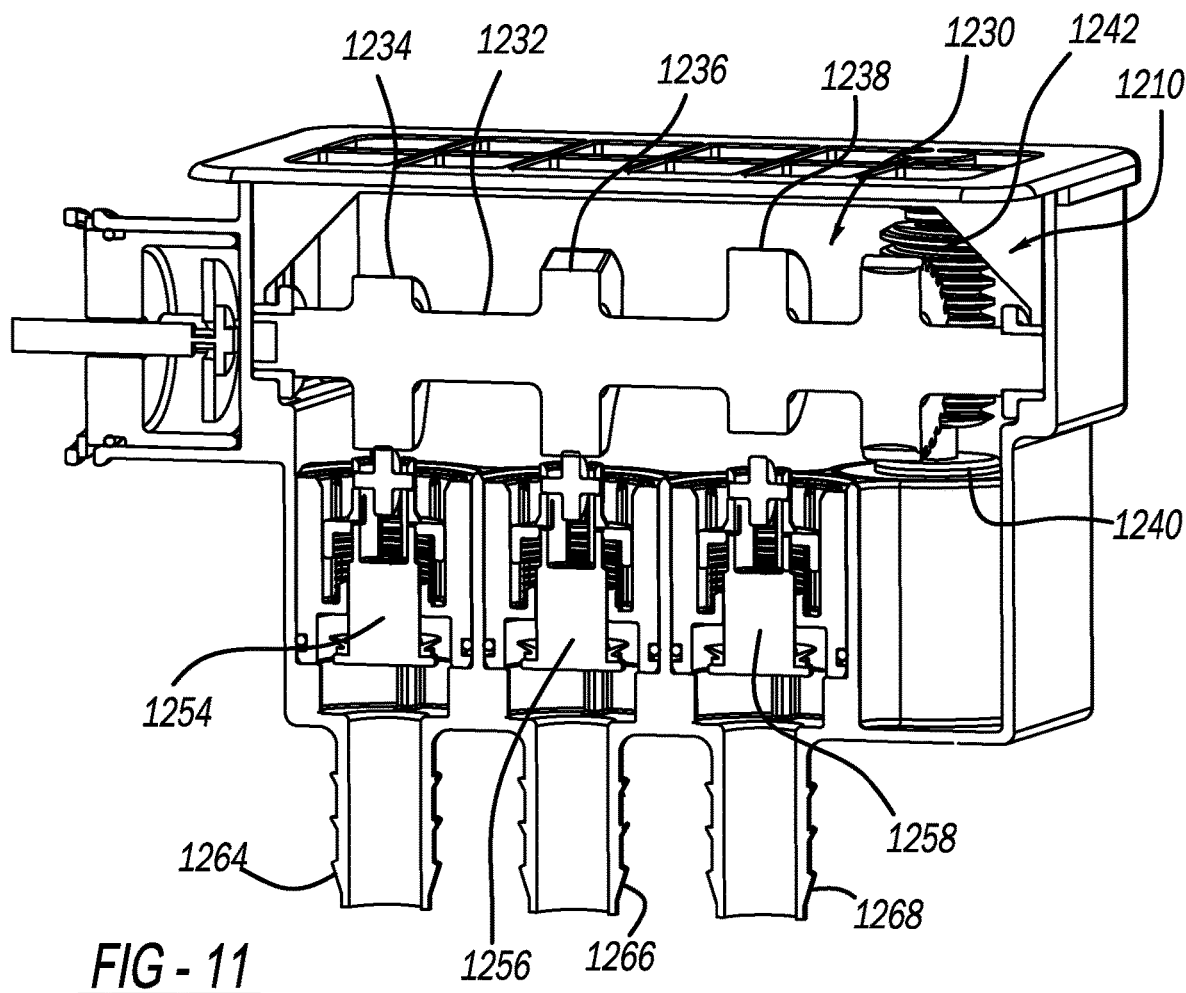
FIG. 11 is a sectional view of the vent shut-off assembly of FIG. 10 taken along lines 11-11.

Turning now to FIGS. 6-7, a vent shut-off assembly 1022B constructed in accordance to another example of the present disclosure will be described. The vent shut-off assembly 1022B includes a main housing 1102 that at least partially houses an actuator assembly 1110. A canister vent line 1112 routs to the canister (see canister 1032, FIG. 1). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1134 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1164 can be eliminated leaving two cams 1136 and 1138 that open and close valves 1156 and 1158. In such an example, the two ports 1168 and 1166 can be 7.5 mm orifices. If both ports 1168 and 1166 are open, refueling can occur. If less flow is required, a cam position can be attained where one of the valves 1156 and 1158 are not opened all the way.

Turning now to FIGS. 10-13, a vent shut-off assembly 1022C constructed in accordance to another example of the present disclosure will be described. The vent shut-off assembly 1022C includes a main housing 1202 that at least partially houses an actuator assembly 1210. A canister vent line 1212 routes to the canister (see canister 1032, FIG. 1). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202.

In one configuration the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1266. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1264 can be eliminated leaving two cams 1236 and 1238 that open and close valves 1256 and 1258. In such an example, the two ports 1268 and 1266 can be 7.5 mm orifices. If both ports 1268 and 1266 are open, refueling can occur. If less flow is required, a cam position can be attained where one of the valves 1256 and 1258 are not opened all the way.

Figure 14:
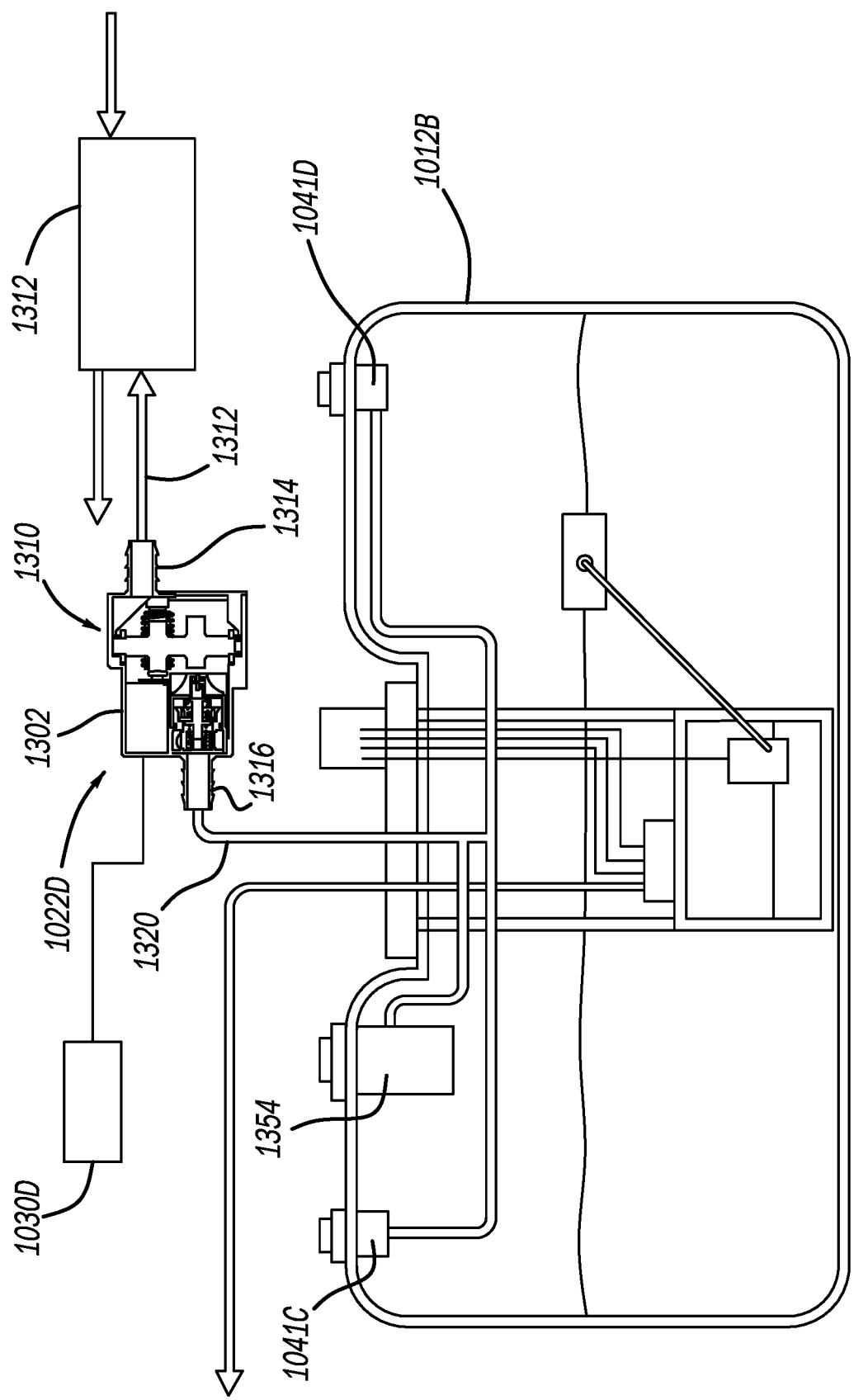
FIG. 14 is a schematic illustration of a fuel tank system having an evaptive module or vent shut-off assembly constructed in accordance with additional features of the present disclosure and positioned in-line with the fuel tank and the carbon canister.

Turning now to FIG. 14, a vent shut-off assembly constructed in accordance to additional features of the present disclosure is shown and generally identified at reference 1022D. The vent shut-off assembly 1022D is shown disposed in-line between a fuel tank 1012B and a carbon canister 1312. In this regard, the vent shut-off assembly 1022D is disposed out of the fuel tank 1012B. The vent shut-off assembly 1022D includes a main housing 1302 that at least partially houses an actuator assembly 1310. A canister vent line 1312 routes from an outlet port 1314 on the housing 1302 of the vent shut-off assembly 1022D to a carbon canister 1312. An inlet port 1316 is provided on the housing 1302 of the vent shut-off assembly 1022D and is fluidly connected to roll over valves 1041C and 1041D via a tank vent line 1320. In the example shown, the inlet port 1316 is further fluidly coupled to the FLVV.

Figure 15:
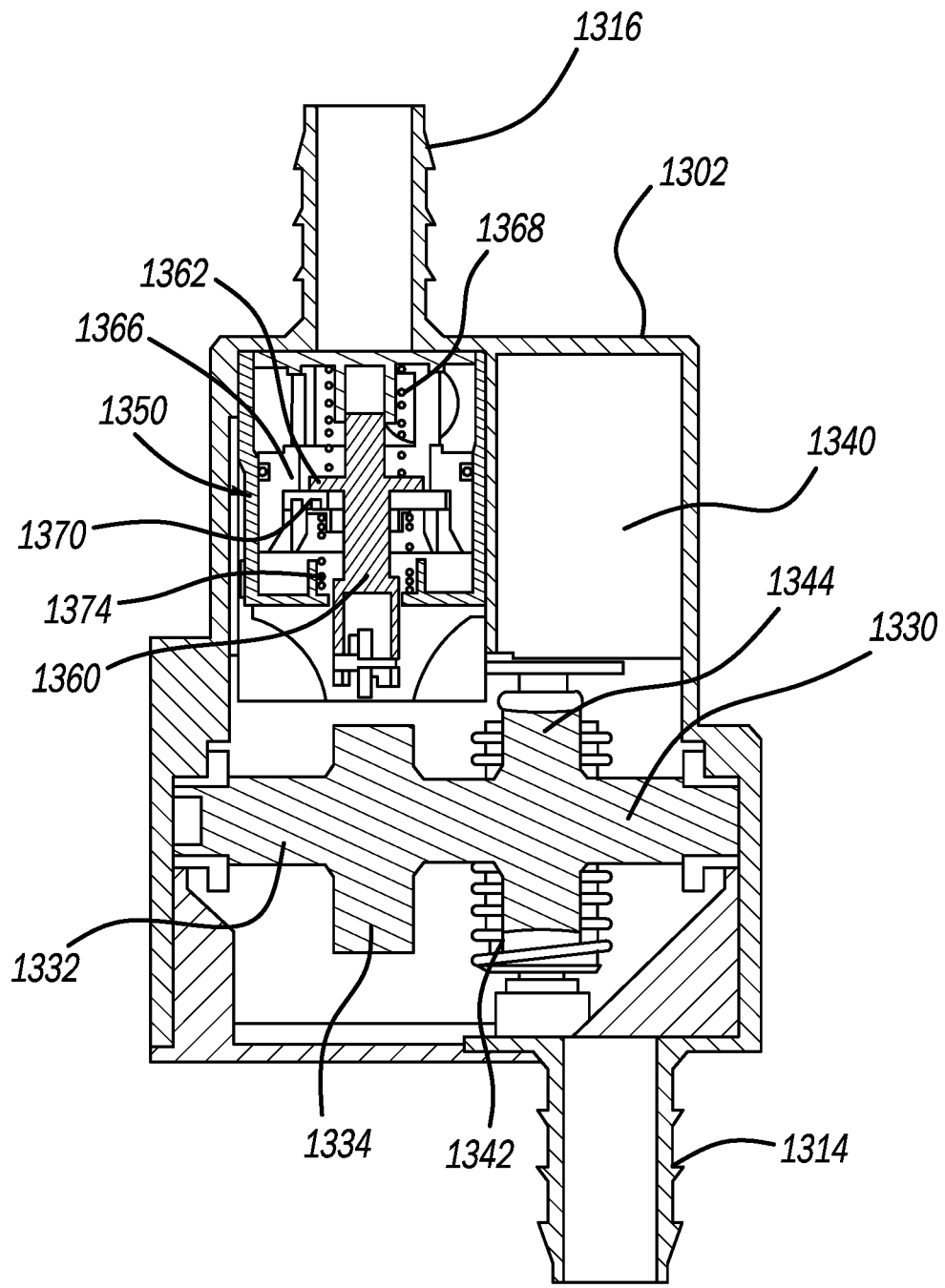
FIG. 15 is a cross-sectional view of the vent shut-off assembly of FIG. 14.

The actuator assembly 1310 can be configured similarly to the actuator assembly 1210 described above (FIG. 11) and can generally be used in place of the solenoids described above to open and close selected vent lines. The vent shut-off assembly 1022D includes a cam assembly 1330 (FIG. 15) constructed similarly to the cam assembly 1230 described above (FIG. 11). The cam assembly 1330 includes a camshaft or drive shaft 1332 that includes a cam 1334. The cam 1334 has a profile that one of opens and closes a poppet valve or plunger assembly 1350.

Figure 12:
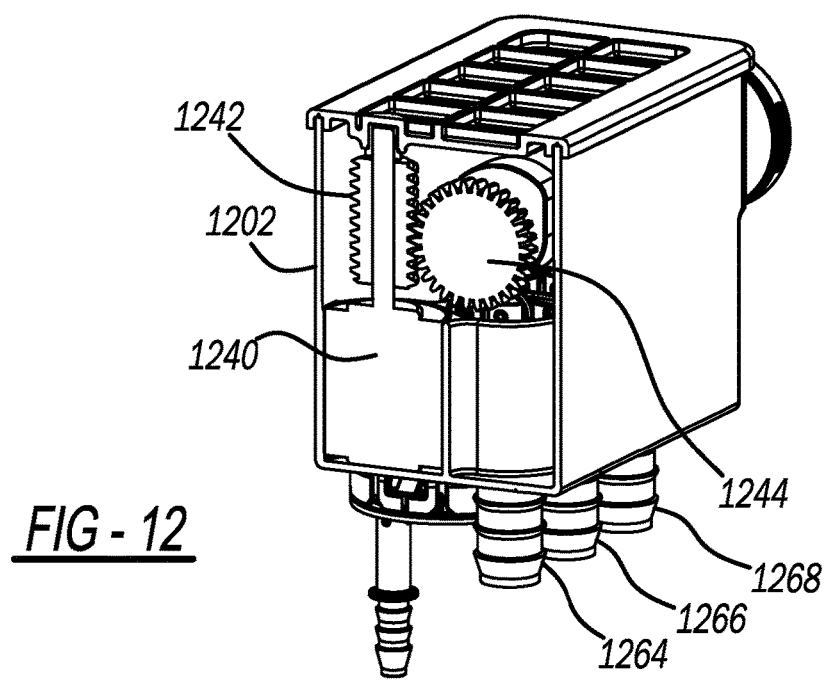
FIG. 12 is a sectional view of the vent shut-off assembly of FIG. 10 taken along lines 12-12.

The drive shaft 1332 is rotatably driven by a motor or gear motor 1340 (see motor 1240, FIG. 12). In the example shown, the motor is received in the housing 1302. While the motor 1340 is shown having a worm 1342 that rotates a gear 1344 on the drive shaft 1332, the motor 1340 and gearing can be configured differently. For example, the motor 1340 can be a direct drive motor arranged along a common axis of the drive shaft 1332 for rotating the drive shaft 1332.

The cam 1334 rotates to open and close plunger sub-assembly 1350. The plunger sub-assembly 1350 includes over pressure relief (OPR) and over vacuum relief (OVR) functions. An over pressure relief event occurs when pressure within the fuel tank 1012B is great enough to cause the plunger sub-assembly 1350 to move a poppet off a valve seat (explained below) allowing vapor to pass from the fuel tank 1012B to the carbon canister 1312. In one example, the threshold can be around 14 kPa for a conventional fuel vehicle and around 37 kPa for a pressurized/hybrid vehicle. An over vacuum relief event occurs when pressure within the fuel tank 1012B has dropped low enough to cause a vacuum wherein the poppet is moved off a valve seat (explained below) allowing vapor to pass into the fuel tank 1012B. Notably, the OPR and OVR functions can occur without any input from the controller 1030D.

The vent shut-off assembly 1022D can offer many of the advantages of the vent shut-off assemblies disclosed above in FIGS. 1-13 but with the flexibility to be mounted outside of the fuel tank. The vent shut-off assembly 1022D can take the place of a vapor blocking valve (VBV) and also perform the OPR/OVR functions all in the same assembly. In addition, the vent shut-off assembly 1022D can take the place of a standard FTIV. The vent shut-off assembly 1022D would no longer function as a liquid trap/drain.

In one application, the vapor shut-off valve 1022D can be used in a hybrid vehicle application. In a high pressure hybrid vehicle fuel tank, pressure is built within the fuel tank 1012B. The pressure needs to be released prior to refueling. The plunger sub-assembly 1350 provides pressure relief necessary for refueling. Explained further, the plunger sub-assembly 1350 can be opened up when refueling. The plunger sub-assembly 1350 can be used to control venting during fueling. In this regard, the plunger sub-assembly 1350 can be used to control the 100% shut-off in the fuel tank 1012B and also provide for the venting during trickle fill events.

On a conventional fuel tank, the vapor shut-off valve 1022D can be used to close off venting from the fuel tank 1012B to the canister 1312 so the canister can be more effectively purged. In summary, the vapor shut-off valve 1022D can be used in place of FTIV for high pressure hybrid applications or be used in place of a vapor blocking valve on a conventional fuel system. The vapor shut-off valve 1022D also adds the functionality of controlled venting during refueling. Further, with the vapor shut-off valve 1022D can be used to control the refueling function, one of the valves used for shut-off in the fuel tank can be eliminated. While a high flow valve is required in the fuel tank 1012B, it does not control the shut-off height. A high flow valve can be placed in the vapor dome and replace one of the roll over valves 1041C, 1041D or the FLVV 1354.

The plunger sub-assembly 1350 will be further described. The plunger sub-assembly 1350 includes a poppet 1360 having a collar 1362 that selectively engages a disk seal 1370. The disk seal 1370 selectively engages a seat 1366.

The plunger sub-assembly 1350 can operate mechanically (without engagement with the cam 1334). The OVR functionality will urge poppet 1360 in a direction upward in FIG. 15 for vacuum relief. In the example provided, the collar 1362 will be urged against a second spring 1368 allowing vapor to pass (into the fuel tank 1012B) between the collar 1362 and the disk seal 1370. The cam 1334 can also actuate poppet 1360 upward by commanding rotation of the camshaft 1330 with a controller 1030D (FIG. 14). It will be appreciated that should there be an electronic failure, the camshaft sub-assembly 1330 cannot be controlled, however the plunger sub-assembly 1350 is configured for mechanical operation regardless of input from the cam 1334. Similarly, disk seal 1370 will be urged downward as viewed in FIG. 15 mechanically during OPR functionality. In the example shown, the disk seal 1370 can be urged downwardly away from seat 1366 into the bias of a first spring 1374 allowing vapor to pass (out of the fuel tank 1012B) between the disk seal 1370 and the valve seat 1366. It is appreciated that the configuration of the plunger sub-assembly 1350 is merely exemplary and other configurations may be used to allow OPR and OVR functionality. For example, a poppet valve assembly disclosed in commonly owned PCT Application WO/EP2019/025055, the contents of which are incorporated by reference herein, may be used in place of poppet valve assembly 1350.

Figure 16:
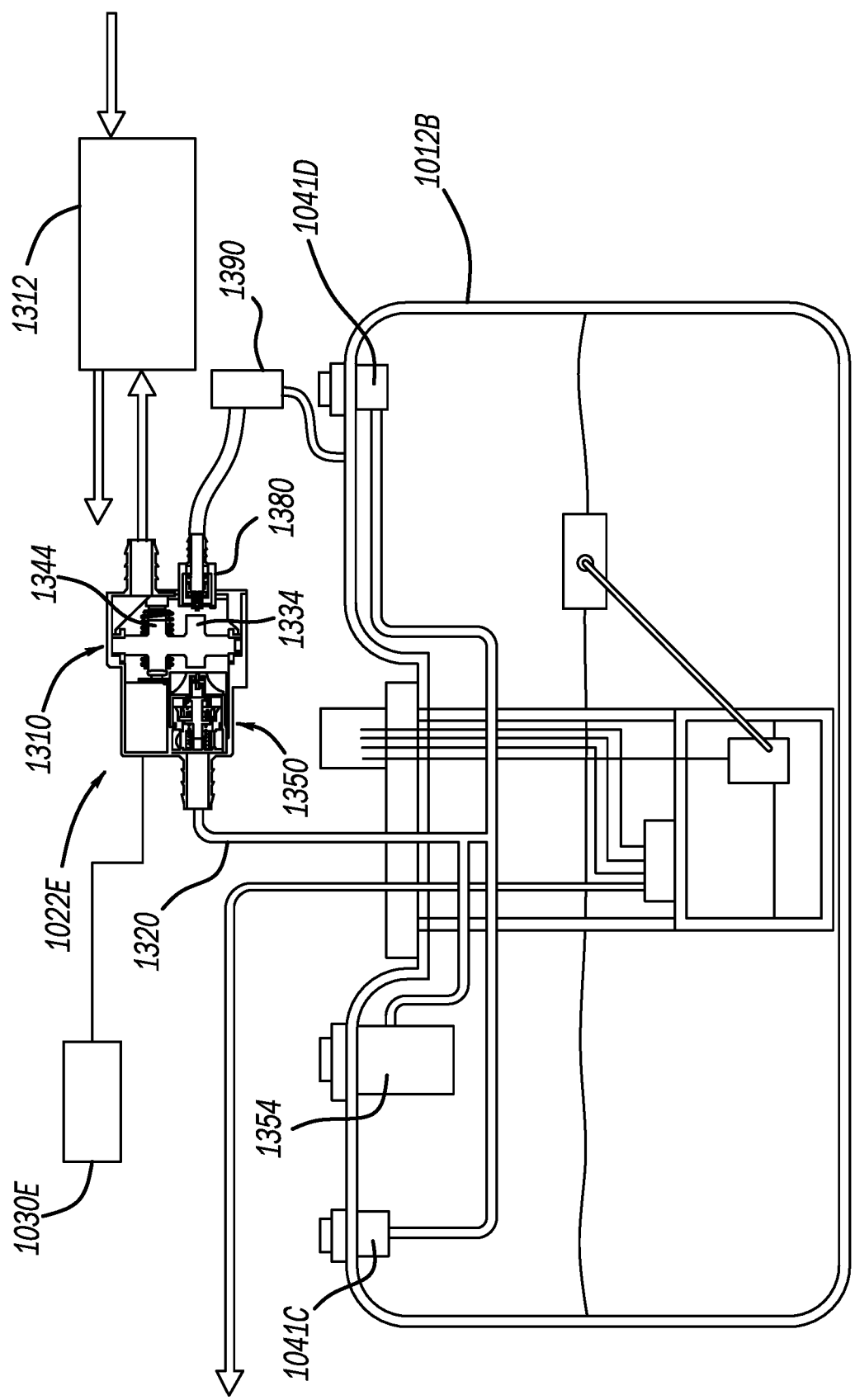
FIG. 16 is a schematic illustration of a fuel tank system having an evaptive module or vent shut-off assembly constructed in accordance to additional features of the present disclosure and positioned in-line with the fuel tank and the carbon canister, the evaptive module having a vapor recirculation line according to additional features of the present disclosure.
Figure 17:
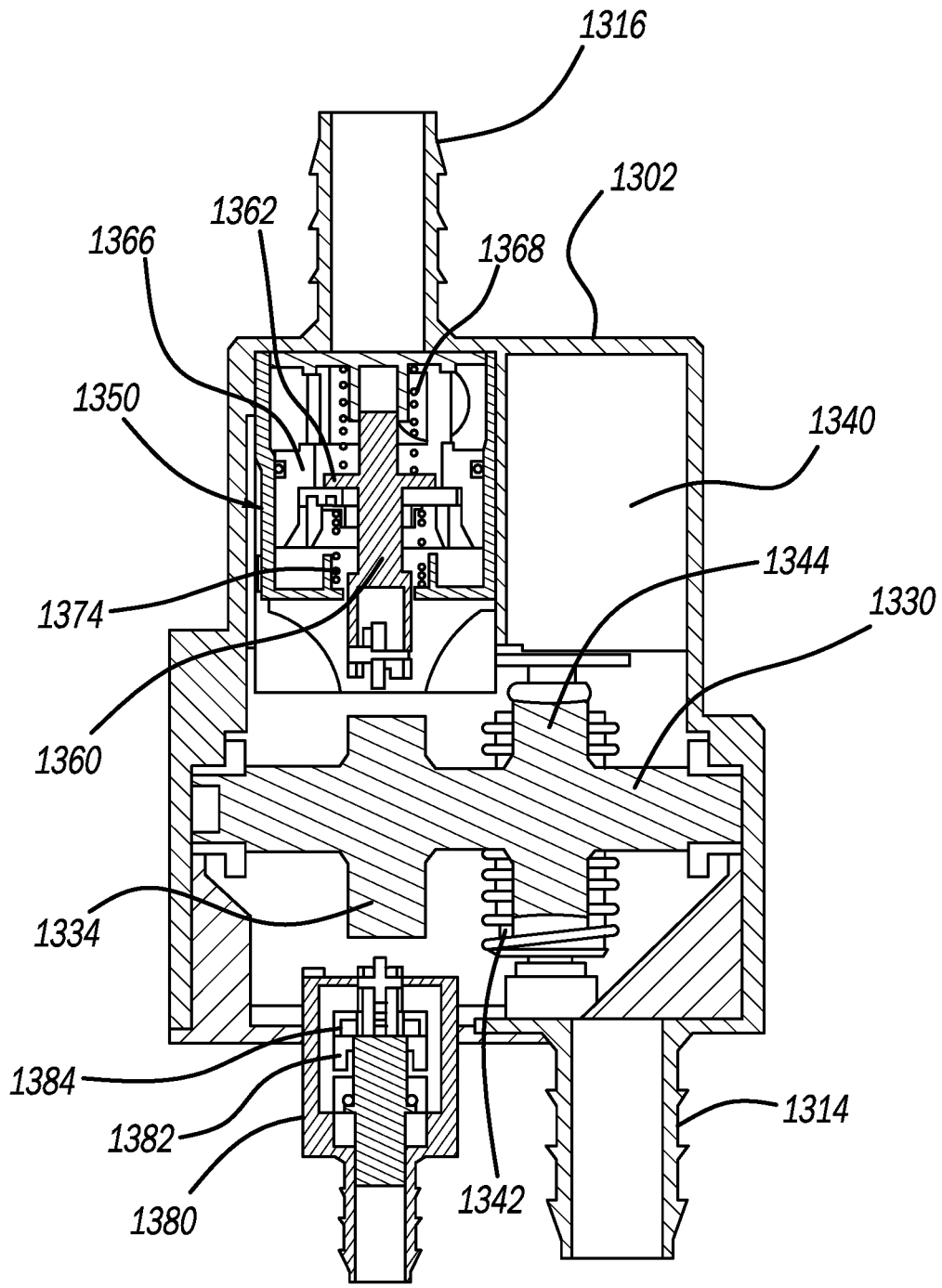
FIG. 17 is a cross-sectional view of the vent shut-off assembly of FIG. 16.

Turning now to FIGS. 16 and 17, a vapor shut-off valve assembly 1022E constructed in accordance to additional features of the present disclosure is shown. Unless otherwise described herein, the vapor shut-off valve assembly 1022E is constructed similarly to the vapor shut-off valve assembly 1022D but also includes a recirculation valve or recirculation line plunger 1380. The actuator assembly 1310 can be rotated based on a signal from a controller 1030E. In the example shown, the recirculation line plunger 1380 is opened by the cam 1334. The recirculation line plunger 1380 has a seal 1382 that selectively lifts off a valve seat 1384 based on urging from the cam 1334. The recirculation line plunger 1380 routes back to an inlet area of refueling filler neck 1390. During refueling, some of the vapor can be sent back into the fuel tank 1012B to reabsorb the vapor. In one advantage, loading of the canister 1312 can be reduced as vapor is instead redirected toward the fuel tank 1012B. The seal 1382 and the valve seat 1384 can cooperate to provide a variable orifice.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vent shut-off assembly configured to manage venting on a fuel tank configured to deliver fuel to an internal combustion engine, the vent shut-off assembly comprising:
    a main housing positioned outside of the fuel tank and that selectively vents to a carbon canister;
    a poppet valve disposed in the main housing, the poppet valve including a plunger that provides over pressure relief (OPR) and over vacuum relief (OVR) functions; and
    an actuator assembly at least partially housed in the main housing, wherein the actuator assembly moves based on an input from a controller that receives signals from system sensors including at least one of a tank pressure sensor that senses pressure of the fuel tank, a canister pressure sensor that senses pressure of the carbon canister, a temperature sensor that senses temperature within the fuel tank, and a vehicle grade sensor that measures a vehicle grade, wherein the input from the controller is based on the signals from the system sensors, the actuator assembly comprising:
        a cam assembly having a cam shaft that includes a cam having a profile that one of opens and closes the poppet valve wherein when the poppet valve is in a closed position, vapor is precluded from passing between the fuel tank and the carbon canister and when the poppet valve is in an open position, vapor is permitted from passing between the fuel tank and the carbon canister; and
        a recirculation line plunger having a seal that selectively lifts off a valve seat based on urging from the cam, wherein the recirculation line plunger is fluidly coupled to a refueling filler neck that is fluidly coupled to the fuel tank;
        wherein the cam is positioned intermediate the poppet valve and the recirculation line plunger, the cam independently urging the poppet valve and the recirculation line plunger.

2. The vent shut-off assembly of claim 1 wherein the main housing further defines an inlet port that is fluidly connected to at least one roll over valve disposed within the fuel tank through a tank vent line.

3. The vent shut-off assembly of claim 2 wherein the main housing further defines an outlet port that is fluidly connected to the carbon canister through a canister vent line.

4. The vent shut-off assembly of claim 1 wherein the actuator assembly further includes a motor.

5. The vent shut-off assembly of claim 4, further comprising a worm gear that rotatably couples the motor and the cam shaft.

6. The vent shut-off assembly of claim 1 wherein the vent shut-off assembly operates during an over pressure relief (OPR) event wherein pressure within the fuel tank is great enough to cause a disk seal to be lifted off of a sealed position with a seat allowing vapor to pass from the fuel tank to the carbon canister.

7. The vent shut-off assembly 6, further comprising a first spring that biases the disk seal toward the seat.

8. The vent shut-off assembly of claim 6 wherein the vent shut-off assembly operates during an over vacuum relief (OVR) event wherein pressure within the fuel tank has dropped low enough to cause a vacuum wherein a collar of poppet is lifted off of a sealing engagement with the disk seal allowing vapor to pass into the fuel tank.

9. The vent shut-off assembly 9, further comprising a second spring that biases the collar toward the disk seal.

10. A vent shut-off assembly configured to manage venting on a fuel tank configured to deliver fuel to an internal combustion engine, the vent shut-off assembly comprising:
    a main housing positioned outside of the fuel tank and that selectively vents to a carbon canister;
    a poppet valve disposed in the main housing, the poppet valve including a plunger that provides over pressure relief (OPR) and over vacuum relief (OVR) functions;
    an actuator assembly at least partially housed in the main housing, wherein the actuator assembly moves based on an input from a controller that receives signals from system sensors including at least one of a tank pressure sensor that senses pressure of the fuel tank, a canister pressure sensor that senses pressure of the carbon canister, a temperature sensor that senses temperature within the fuel tank, and a vehicle grade sensor that measures a vehicle grade, wherein the input from the controller is based on the signals from the system sensors, the actuator assembly comprising:

a cam assembly having a cam shaft that includes a cam having a profile that one of opens and closes the poppet valve wherein when the poppet valve is in a closed position, vapor is precluded from passing between the fuel tank and the carbon canister and when the poppet valve is in an open position, vapor is permitted from passing between the fuel tank and the carbon canister; and a recirculation line plunger having a seal that selectively lifts off a valve seat based on urging from the cam, the recirculation line plunger fluidly coupled to a refueling filler neck that is fluidly coupled to the fuel tank, wherein the cam is positioned intermediate the poppet valve and the recirculation line plunger, independently urging the poppet valve and the recirculation line plunger.

11. The vent shut-off assembly of claim 10 wherein the main housing further defines an inlet port that is fluidly connected to at least one roll over valve disposed within the fuel tank through a tank vent line.

12. The vent shut-off assembly of claim 11 wherein the main housing further defines an outlet port that is fluidly connected to the carbon canister through a canister vent line.

13. The vent shut-off assembly of claim 10 wherein the vent shut-off assembly operates during an over pressure relief (OPR) event wherein pressure within the fuel tank is great enough to cause a disk seal to be lifted off of a sealed position with a seat allowing vapor to pass from the fuel tank to the carbon canister.

14. The vent shut-off assembly 13, further comprising a first spring that biases the disk seal toward the seat.

15. The vent shut-off assembly of claim 13 wherein the vent shut-off assembly operates during an over vacuum relief (OVR) event wherein pressure within the fuel tank has dropped low enough to cause a vacuum wherein a collar of poppet is lifted off of a sealing engagement with the disk seal allowing vapor to pass into the fuel tank.

16. The vent shut-off assembly 15, further comprising a second spring that biases the collar toward the disk seal.

* * * * *